UNITED STATES PATENT OFFICE.

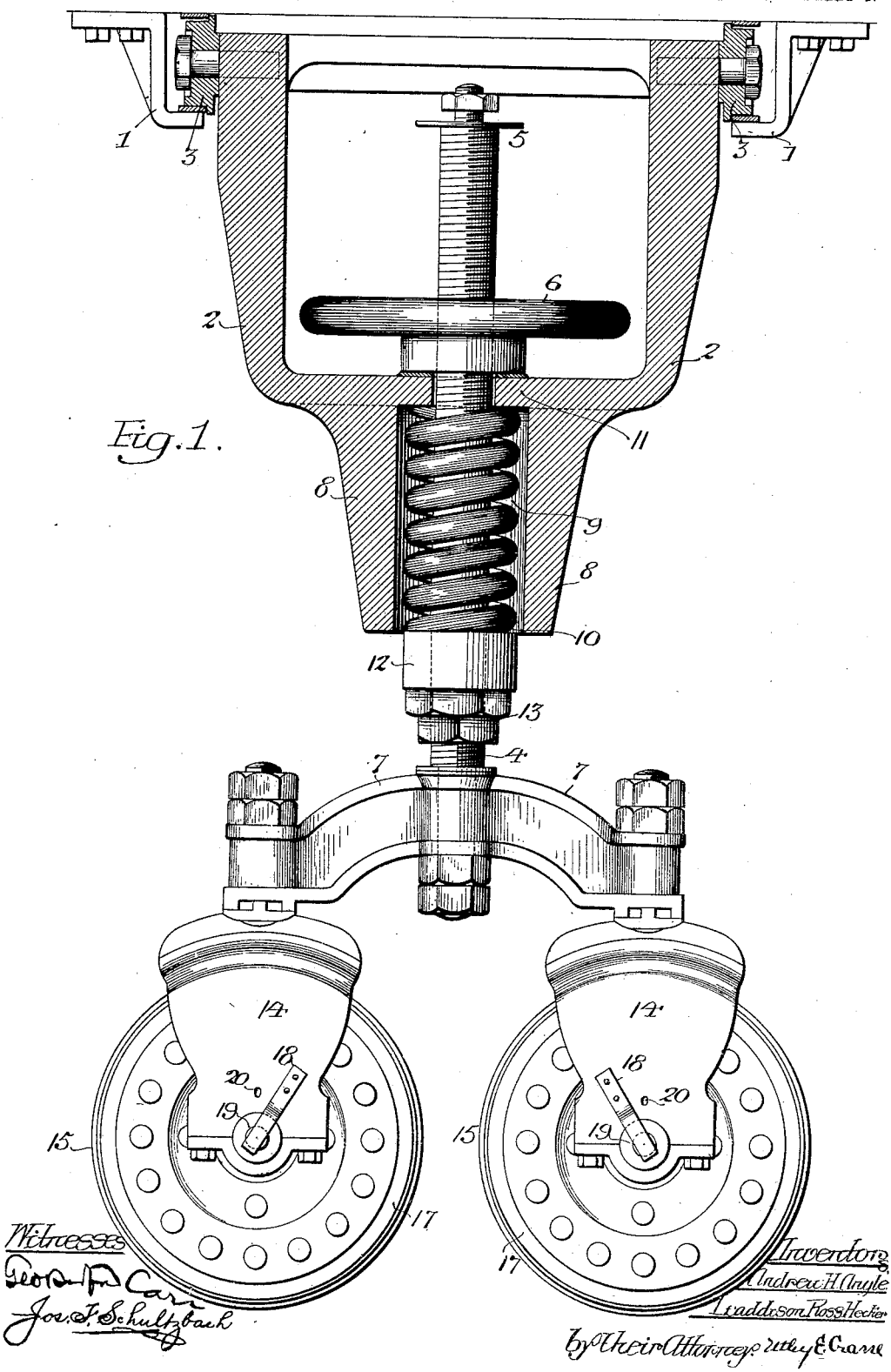

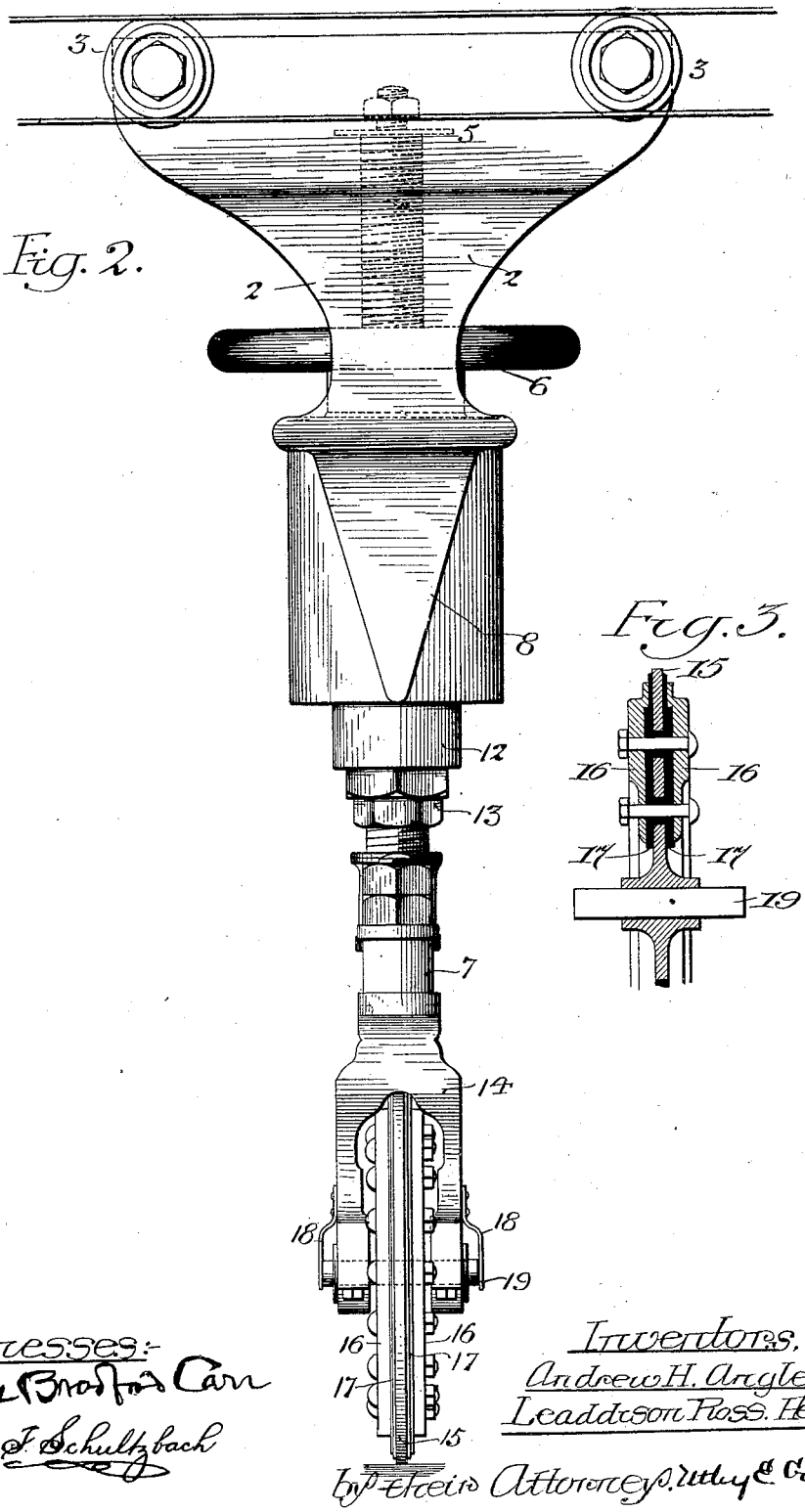

ANDREW H. ANGLE AND LEADDISON ROSS HECKER, OF PHILADELPHIA, PENNSYLVANIA, ASSIGNORS TO SAFETY ELECTRIC RAILWAY CONSTRUCTION COMPANY, OF PHILADELPHIA, PENNSYLVANIA, A CORPORATION OF THE DISTRICT OF COLUMBIA.

ELECTRIC-CURRENT COLLECTOR.

No. 926,088.  Specification of Letters Patent.  Patented June 29, 1909.

Application filed July 13, 1907. Serial No. 383,701.

*To all whom it may concern:*

Be it known that we, ANDREW H. ANGLE and LEADDISON ROSS HECKER, citizens of the United States, and residents of Philadelphia, in the county of Philadelphia and State of Pennsylvania, have invented certain new and useful Improvements in Electric-Current Collectors, of which the following is a specification.

This invention relates to improvements in electric current collectors used in connection with underground conduit systems for electric railways, and the principal object may be said to reside in the providing of a collector that is simple in construction, efficient in character and that is comparatively inexpensive to manufacture.

A further object is to provide a current collector that may be suspended from a car body so as to oscillate back and forth thereunder.

A still further object is to provide a current collector whose collector wheels have swivel and cushioned relation with the oscillating portion of the device.

Other objects will appear hereinafter.

To these and other ends hereinafter set forth the invention comprises the improvements to be presently described and finally claimed.

The nature, characteristic features and scope of our invention will be more fully understood from the following description taken in connection with the accompanying drawings forming part hereof, and in which—

Figure 1 is an elevational view partly in section illustrating an electric current collector embodying the invention, Fig. 2 is an end elevational view of the same, and Fig. 3, is a view in cross section of the collector wheel illustrating the conducting and insulating plates.

In the drawings there are shown a pair of angle irons 1, forming a track. These angle irons are adapted to be secured to the under side of a car body, not shown, and are arranged laterally in respect thereto. 2 is a truck having journaled thereto rollers 3; said rollers being capable of traveling upon the angle irons 1, and thus impart to the collector as a whole, a lateral movement. Penetrating the truck 2 is a shaft 4, the upper part of which is shown as being threaded and provided with a suitable binding post 5. Engaging this threaded portion of the shaft is a screw threaded hand wheel 6, the purpose of which will be described hereinafter, it being understood, however, that said wheel is illustrated in its lowest position. The lower end of the shaft 4 carries and has swivel relation therewith a bridge piece 7. Arranged between the truck 2 and the bridge piece 7, is a cushion-like device which will now be described.

As shown in the drawings the truck 2 is provided with a depending web 8, which is internally recessed as at 9, for the reception of a spring 10. This spring is interposed between the flanged part 11, of the truck 2, and an adjustment nut 12 held in place by the lock nut 13. The tension of the spring 10 may be regulated by the hand wheel 6, it being understood that when the said wheel is in the position shown in the drawings the collector wheels are lifted clear of the conduit and by rotating the said hand wheel to the top of the shaft 4, the tension of the spring is released and the said collector wheels are permitted to contact with the conduit. Depending from the bridge piece 7 and rigidly secured thereto are forked or bifurcated bearing plates 14, in which are rotatably journaled the collector wheels. As shown in the drawings these collector wheels comprise central plates 15, of conducting material. Arranged upon the opposite faces of the plates 15, are side plates 16, forming flanges adapted to travel upon a third rail or conduit, similar to the underground conduit system described and claimed in Letters Patent 745,033, dated November 24th, 1903. These side plates are insulated from the central plate by means of insulation 17. 18 are contact members secured to the forked plates 14, and are arranged to press against the ends of the axle 19 upon which the collector wheels are mounted, to insure a good contact. This construction is preferable since dirt and other foreign substances accumulating between the axle and frame have the tendency to form a species of insulation. By the above described device it is obvious that all vibrations of the car body will be referred to the spring 10, and thus cause the truck 2 to vibrate with the rising and falling motion of the car. This is advantageous in that the collector wheels will thus be relieved from any undue jarring or vibratory movement. Likewise any rolling of the car body will serve to oscillate the truck 2 and thus relieve the device from any undue strain. By swiveling the collector wheels in respect to the truck 2, the said wheels may revolve freely on said shaft and readily accommodate themselves to curvatures in the conduit system. 20 indicates means for introducing lubricants to the bearings and axle of the collector wheels.

Having thus described the nature and objects of our invention, what we claim as new and desire to secure by Letters Patent is—

1. An electric current collector comprising a truck capable of lateral movement, a vertically arranged shaft carrying a bridge plate having sliding engagement with said truck, a cushion interposed between the truck and the bridge piece, a current collecting medium rotatably connected with the bridge piece, and a hand wheel rotatably mounted on said shaft for raising and lowering the collecting medium.

2. An electric current collector comprising a truck capable of lateral movement, a vertically arranged shaft carrying a bridge piece having sliding engagement with said truck, said shaft being screw threaded, current collecting wheels rotatably connected with the bridge piece, a cushion between the truck and bridge piece, and a hand wheel having screw threaded relation with said shaft for raising and lowering collector wheel.

3. In combination a car body having a laterally arranged track upon its under side, a truck mounted upon rollers said truck being adapted to oscillate upon said track, a shaft penetrating said truck and affording sliding engagement therewith, a bridge piece revolubly carried by said shaft, bearing plates for said bridge piece, collector wheels journaled in said plates, flanged plates upon said wheels insulated from said collector and a cushion between the bridge piece and truck.

4. An electric current collector comprising a bridge piece equipped with bearing plates, a rotatable collector wheel journaled in said plates, a truck, a vertically arranged shaft having swivel connection with said bridge piece and projected through the truck, a spring interposed between the truck and bridge piece, a hand wheel movable on said shaft for raising and lowering the collector wheel and spring contact members carried by the bearing plates said members contacting with the ends of the axle carrying the collector wheel, said plates being provided with means for introducing a lubricant to said axle.

In testimony whereof we have hereunto set our hands this 20th day of June, 1907 in the presence of the subscribing witnesses.

ANDREW H. ANGLE.
LEADDISON ROSS HECKER.

Witnesses:
W. J. JACKSON,
UTLEY E. CRANE.